(12) United States Patent
Feng et al.

(10) Patent No.: US 10,762,549 B2
(45) Date of Patent: Sep. 1, 2020

(54) ANALYSIS AND COLLECTION SYSTEM FOR USER INTEREST DATA AND METHOD THEREFOR

(71) Applicant: CHINA UNIONPAY CO., LTD., Shanghai (CN)

(72) Inventors: Liang Feng, Shanghai (CN); Yawei Yin, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 414 days.

(21) Appl. No.: 15/536,960

(22) PCT Filed: Dec. 2, 2015

(86) PCT No.: PCT/CN2015/096217
§ 371 (c)(1),
(2) Date: Jun. 16, 2017

(87) PCT Pub. No.: WO2016/101777
PCT Pub. Date: Jun. 30, 2016

(65) Prior Publication Data
US 2018/0005297 A1   Jan. 4, 2018

(30) Foreign Application Priority Data
Dec. 26, 2014 (CN) .......................... 2014 1 0823475

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06F 16/9535* (2019.01); *G06Q 30/02* (2013.01)

(58) Field of Classification Search
None
See application file for complete search history.

(56) References Cited

U.S. PATENT DOCUMENTS

2008/0103907 A1* 5/2008 Maislos ................. G06Q 10/10
 705/14.54
2010/0191582 A1* 7/2010 Dicker ................... G06Q 30/02
 705/14.51

(Continued)

FOREIGN PATENT DOCUMENTS

CN       101324948 A      12/2008
CN       103294800 A      9/2013
(Continued)

OTHER PUBLICATIONS

Varnagar, C.R., A Devised Framework for Content Recommendation System Using Collaborative Log Mining, Mar. 1, 2013, 2013 International Multi-Conference on Automation, Computing, Communication, Control, and Compressed Sensing, pp. 532-539 (Year: 2013).*

(Continued)

*Primary Examiner* — Michael Misiaszek
*Assistant Examiner* — Timothy J Kang
(74) *Attorney, Agent, or Firm* — The Ollila Law Group LLC

(57) ABSTRACT

The application provides a user interest data analysis and collection system which comprises: a session identification module, which is used for offline extracting log data and a merchandise purchase history record corresponding to the log data from a Web server, and for processing the log data, thereby generating a page browsing sequence reference set; a recommendation service controller which is used for collecting user's browsing record in real time; a log data pre-processing module which is used for, when predetermined conditions are satisfied, receiving the user's browsing log data in this session from the recommendation service controller, and for pre-processing the log data; and a match analysis module which is used for matching the pre-processed log data with the generated page browsing sequence (Continued)

reference set, and determining a set of merchandise that the user is potentially interested in, according to the matching result. The application also discloses a method of analyzing and collecting user interest data.

8 Claims, 1 Drawing Sheet

(51) Int. Cl.
*G06F 16/9535* (2019.01)
*G06Q 30/02* (2012.01)

(56) References Cited

U.S. PATENT DOCUMENTS

| | | |
|---|---|---|
| 2011/0173098 A1 | 7/2011 | Lee |
| 2014/0372429 A1 | 12/2014 | Ziklik et al. |
| 2015/0169744 A1* | 6/2015 | Walkingshaw .... G06Q 30/0251 707/738 |

FOREIGN PATENT DOCUMENTS

| | | |
|---|---|---|
| CN | 103678652 A | 3/2014 |
| CN | 103812683 A | 5/2014 |
| CN | 103839169 A | 6/2014 |
| CN | 103885968 A | 6/2014 |
| TW | 201128415 A | 8/2011 |
| TW | 201216185 A | 4/2012 |
| WO | 2004029777 A2 | 4/2004 |
| WO | 2006061797 A2 | 6/2006 |

OTHER PUBLICATIONS

Jia Li et al., "Combining Usage, Content, and Structure Data to Improve Web Site Recommendation", In: "ECCV 2016 conference", Jan. 1, 2004, Springer International Publishing, Cham 032548, XP055472475, ISSN: 0302-9743, ISBN: 978-3-319-69952-3, vol. 3182, pp. 305-315, DOI: 10.1007/978-3-540-30077-9_31, Dept. of Computing Science, University of Alberta, Edmonton, AB, Canada.

* cited by examiner

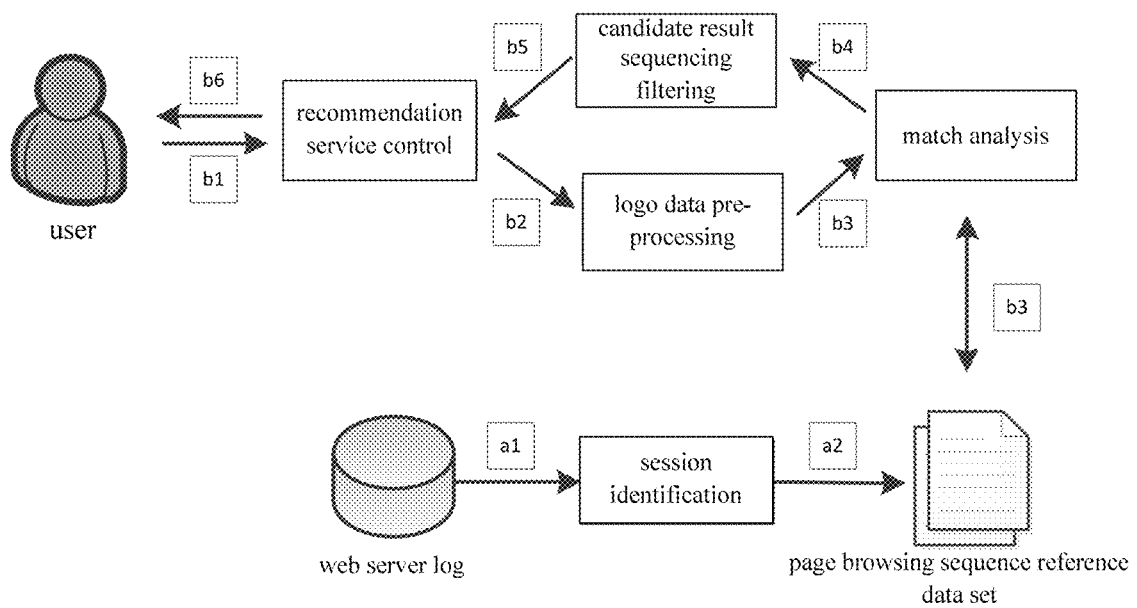

ANALYSIS AND COLLECTION SYSTEM FOR USER INTEREST DATA AND METHOD THEREFOR

FIELD OF THE INVENTION

The invention relates to the technical field of electronic information, and specifically, to a user interest data analysis and collection system and a method thereof.

BACKGROUND

With the rapid development of internet, the user scale of online shopping in China is increasing continuously. In 2010, the transaction scale of online shopping market in China is close to 500 billion, reaching up to 498 billion and accounting for 3.2% of the total volume of retail sales of social consumer goods; meanwhile, the user scale of online shopping reaches up to 1.48 hundred million, and has a penetration rate of 30.8% in netizen. For some traditional enterprises, it is already very difficult to incur any major changes to the current market through some traditional marketing means. If there is intention to open the distribution channels of the enterprise completely, new concepts and new method must be introduced for the enterprise. Online shopping has just provided a very good opportunity and platform for current traditional enterprises. By way of a third-party platform and by establishing a self-possessed platform, the traditional enterprises are testing online shopping one after another. Establishing a reasonable online shopping platform, integrating channels and perfecting industrial layouts have become the focuses and outlets for the development of traditional enterprises in the future.

With the stampeding rise of online shopping platforms, how to analyze and collect user interest data based on big data so as to better provide recommendation for the user and to improve user's experiences has become the focus of research.

Chinese patent application No. 201310717507.4 (entitled "information individualized recommendation method based on Web log data") describes a Web recommendation technology using log analysis. In this patent, by analyzing and pre-processing data of Web log files in a server, clean, regular and accurate data source is extracted; a user interest matrix is established by using collaborative filtering technology, the degree of similarity between individual users is calculated, and the users having larger degrees of similarity are selected as similar users; a recommendation resource pool is established for the interests and hobbies of similar users; the server selects a page in the recommendation resource pool whose recommendation value is greater than a threshold value and recommends it to the user.

However, in this patent, the measurement of user's interest is the time which the user spends in browsing a certain resource classification. The interest granularity acquired by analysis is largely dependent on the thickness granularity of resource classification. If the granularity is thicker, it is difficult to accurately determine fine tendency of interest. Moreover, the pages browsed by the user typically cover a plurality of classification subjects. Page data sources of the plurality of subjects will result in an inaccurate final analysis result.

SUMMARY OF THE INVENTION

In order to address the above problem, the application provides a merchandise recommendation method based on user's sequence in browsing pages. When a new user accesses an online business website, by dividing the browsing record sequence in the user's current session into a plurality of browsing sub-sequences, analyzing and matching the sub-sequences and browsing records of other users in the Web log, history sessions of similar page browsing records are found; finally, according to final actually purchased merchandise of the similar sessions, relevant merchandise recommendation is carried out.

According to an aspect of this application, a user interest data analysis and collection system is provided. The system comprises a session identification module, a recommendation service controller, a log data pre-processing module and a match analysis module, wherein the session identification module is used for offline extracting log data and a merchandise purchase history record corresponding to the log data from a Web server, and for processing the log data, thereby generating a page browsing sequence reference set. The recommendation service controller is used for collecting user's browsing record in real time. The log data pre-processing module is used for, when predetermined conditions are satisfied, receiving the user's browsing log data in this session from the recommendation service controller, and for pre-processing the log data. The match analysis module is used for matching the pre-processed log data with the generated page browsing sequence reference set, and determining a merchandise set that the user is potentially interested in, according to the matching result.

The above system may further comprise a candidate result filtering sequencing module, which is used for receiving the determined merchandise set from the match analysis module, for sequencing the merchandise in the merchandise set according to a preset recommendation rule, and for sending the result of sequencing to the recommendation service controller.

In the above system, the recommendation service controller is further configured to select a final recommendation merchandise according to the result of sequencing sent by the candidate result filtering sequencing module, and to send it to the user.

In the above system, the session identification module is configured to execute the following steps: eliminating log entries whose requested resource is non-page, by checking the suffix of the requested resource URI; eliminating log entries whose state response code is error; gathering all the log records of the same session identifier so as to form a session log record set belonging to this session identifier; and determining whether the session contains a purchase page and a payment page so as to screen sessions for which purchases are finally completed.

In the above system, when the number of pages accessed by user exceeds a preset number N, the recommendation service controller extracts all the log entry sequences in the current session of this user from the log of the Web server so as to initiate recommendation service.

In the above system, the log data pre-processing module is configured to execute the following steps: eliminating non-page log entries and log entries whose response code is error from the log entry sequence so as to form a refined log entry sequence Lp; generating a plurality of continuous log entry sub-sequences having a predetermined length, according to the refined log entry sequence Lp; and transforming each sub-sequence in the continuous log entry sub-sequences into a m-dimensional weight vector using the following formula:

$$w_{1,i} = f(l, i) \cdot \left(\frac{1}{\text{Count}(i)} + 1\right)^{1/\lambda} \cdot t(l, i)$$

wherein $W_{1,i}$ represents the $i^{th}$ dimensional weight of a certain sub-sequence, f(1,i) represents the number of times that the URL of the $i^{th}$ dimensional log entry appears in sub-sequence 1, Count(i) represents the number of times that the $i^{th}$ dimensional URL appears in the page browsing sequence reference set, t(l,i) represents the length of time that the client spends in browsing this page for this time, and λ is the weight factor of Count function.

In the above system, the match analysis module calculates a matching degree using the following formula:

$$Sim(l_1, l_2) = \frac{2 \cdot \sum_{i}^{m} \min(w_{1i}, w_{2i})}{\sum_{i}^{m} w_{1i} + w_{2i}}$$

wherein $l_1$ and $l_2$ represent two given sequences, $W_{1i}$ is the $i^{th}$-dimensional weight in sequence $l_1$, $W_{2i}$ is the i-dimensional weight in sequence $l_2$, and function min returns a smaller one of the two values.

In the above system, the match analysis module is further configured for: for each reference browsing sequence in the page browsing sequence reference set, selecting a largest value of matching degree between it and each sub-sequence in the pre-processed log data as the weight of this reference browsing sequence, according to a matching result between the pre-processed log data and the generated page browsing sequence reference set; picking the first n reference browsing sequences which has the largest weights so as to generate a reference sequence set SeC; and for each candidate reference browsing sequence in the reference sequence set SeC, finding out a purchased merchandise set relevant to the sequence as a set of merchandise that the user is potentially interested in.

In the above system, the candidate result filtering sequencing module is configured for: accumulating the weights of the candidate reference sequences corresponding to each merchandise in the merchandise set as the weight of this merchandise, according to the merchandise set determined by the match analysis module; sequencing the merchandise in the merchandise set according to the weights of the merchandise; and taking a certain number of merchandise having larger weights as final recommendation merchandise and informing the recommendation service controller.

According to another aspect of the application, a method of analyzing and collecting user interest data is provided. The method comprises step A: extracting log data and a merchandise purchase history record corresponding to the log data from a Web server, and processing the log data, thereby generating a page browsing sequence reference set; step B: collecting user's log data in real time; step C: pre-processing the user's log data when predetermined conditions are satisfied; and step D: matching the pre-processed log data with the generated page browsing sequence reference set, and determining a set of merchandise that the user is potentially interested in, according to the matching result.

The analysis data source of the technical solution of this application is the page browsing record of the current session. The data has a low dependency and is convenient to collect. The operation process is straightforward. Meanwhile, the page browsing record of the session implies user's potential interest tendency and purchasing habits, which is advantageous for improving the accuracy and individualization of recommendation service.

BRIEF DESCRIPTION OF THE DRAWINGS

Various aspects of the invention will be more clearly understood by those skilled in the art after reading the specific embodiments of the invention with reference to the accompanying drawings. It should be understood by those skilled in the art that these drawings are merely provided for illustrating the technical solutions of the invention in connection with the specific embodiments with no intention to limit the scope of protection of the invention.

FIG. 1 is a flowchart of performing analysis, collection and merchandise recommendation for user interest data based on page browsing sequence according to an embodiment of the application.

DETAILED DESCRIPTION OF THE INVENTION

Some of a plurality of possible embodiments of the invention will be described below with the purpose of providing a basic understanding of the invention rather than identifying key elements or crucial elements of the invention or limiting the scope of protection. It can be easily understood that according to the technical solution of the invention, those skilled in the art can propose other implementations that can be replaced with each other without departing from the true spirit of the invention. Therefore, the following specific embodiments and drawings are merely exemplary description of the technical solutions of the invention, and should not be considered as the entirety of the invention or as limiting or restricting the technical solutions of the invention.

In a log file, each record in referred to as log item or entry, meaning one resource request from the client to the server. Currently, many mainstream log formats (e.g., common log format (CLF) and extended common log format (ECLF)) typically contains several important fields of the client request: IP address, request time, path name of the requested resource, state response code, user operation system, and browser type, so as to indicate the details of the request from the client to the Web server. User browsing website session refers to a set of history records of websites accessed by the user within a continuous time period. Generally, one user session represents one complete browsing record of the user.

An overall flowchart of the entire feedback interactive user interest data analyzing and collecting scheme is composed of two parts: "generating user page browsing sequence reference data set" and "carrying out merchandise recommendation service". As shown in FIG. 1, the whole process is described as follows:

1) the system extracts part of the log and a corresponding merchandise purchase history record from a Web server (see block a1);

2) the log data is pre-processed and the session is identified so as to screen session records that finally form user's purchases and to generate a page browsing sequence reference data set (see block a2);

3) when the user logs onto a website, the recommendation service controller collects browsing records of the user in real time (see block b1), initiates recommendation service when predetermined conditions are satisfied, and send the browsing log data in this session of user to the log data pre-processing module (see block b2);

4) the browsing data of user is pre-processed and sent to the match analysis module (see block b3);

5) the match analysis module analyzes and matches the sub-sequences and the history browsing records of other users in the Web log so as to find history sessions of similar page browsing records and generate candidate recommendation merchandise set to be sent to the "candidate result filtering sequencing" module (see block b4);

6) the recommendation merchandise are sequenced according to a preset recommendation rule in combination with similarity, and the sequencing is sent to the recommendation service controller (see block b5) and subsequently sent to the user (see block b6);

wherein the steps 1) and 2) are responsible for generating the user page browsing sequence reference data set, and the subsequent steps are responsible for carrying out recommendation service. In the following, the operation steps of this technical solution will be described in detail:

1. Generating User Page Browsing Sequence Reference Data Set

Before analyzing the Web server log, it is required to extract log entries that are valuable for the analysis and to form a session by gathering. In order to identify user session, the server of website uses and saves session ID, and the log entries in the server log preserve session ID fields so as to save the session ID value of this request. Generally, session ID is a kind of read-only value which uniquely identifies the client who is accessing the server currently.

The specific steps are as follows:

1) eliminating log entries whose requested resources are non-pages such as picture, video, script, etc., by checking the suffix of the requested resources URI;

2) eliminating log entries whose state response codes are error (e.g., 400, 404, 505);

3) determining whether requested operations are from the same session by checking session IDs in the log entries. Log entries having the same session ID and a time difference between service requests smaller than a set vale of the server are determined to belong to the same session;

4) gathering all the log records of the same session ID so as to form a session log record set belonging to this session ID;

5) saving the session ID by URL replicating if the browser of the client does not support cookie storing. At this time, it is required to delete session ID parameters in the URL in the URL items of the log entries.

6) determining whether the session contains purchase page and payment page and screening sessions for which purchases are finally completed, as a reference record of collaborative filtering.

In an embodiment, the user session log record of one reference comprises user browsing page sequence L in the session and the list P of finally purchased merchandise.

2. Carrying Out Merchandise Recommendation Service

After generating user page browsing sequence reference data set offline, the recommendation system online tracks user's accessing records on the electronic business website in real time, and carries out recommendation service according to these records. The specific steps are as follows:

1) the recommendation system tracks user's accessed page records in the current session by accessing the web server log of the electronic business website (or in other ways). When the number of accessed page exceeds a fixed number N (which is preset), the recommendation service controller extracts all the log entry sequences Lr of the user in the current session from the web server log, and initiates recommendation service;

2) in a way similar to that of the first chapter, non-page log entries and log entries whose response codes are error are eliminated from the log entry sequences Lr of the user in the current session. If the URL contains session ID item, the session ID item is trimmed. Finally, a refined log entry sequence Lp belonging to this session is formed.

3) a plurality of continuous log entry sub-sequences $l_1$, $l_2 \ldots l_n$ having a predetermined length w are generated, according to the refined log entry sequence Lp, and the set of the sub-sequences is represented as Sub(Lp). For example, for a log entry sequence Lp=$\{a_1,a_2,a_3,a_4,a_5\}$, the generated continuous log entry sub-sequences having a length of 3 are $l_1=\{a_1,a_2,a_3\}$, $l_2=\{a_2,a_3,a_4\}$ and $l_3=\{a_3,a_4,a_5\}$. The value of w is set in advance. If the length of Lp is smaller than or equal to w, then Sub(Lp)=$\{Lp\}$.

4) representing each sub-sequence $1=\{a_1,a_2,\ldots,a_n\}$ as a m-dimensional weight vector w(l)=$\{w_1,w_2,\ldots,w_m\}$, wherein $W_i$ is the $i^{th}$ dimensional weight of a corresponding log entry, and m is the total number of URL appearing in all the log entries in the reference set. $W_i$ is calculated as follows:

$$w_{l,i} = f(l,i) \cdot \left(\frac{1}{\text{Count}(i)} + 1\right)^{1/\lambda} \cdot t(l,i)$$

wherein f(l,i) represents the number of times that the URL of the $i^{th}$ dimensional log entry appears in sub-sequence 1. If there is no $i^{th}$ dimensional URL in sub-sequence 1, then f(l,i) equals to 0. Count(i) represents the number of times that the $i^{th}$ URL appears in the reference set 1. t(l,i) represents the length of time that the user spends in browsing this page, and is calculated through a time difference between this log entry and the next log entry, in the unit of second. Parameter λ is the weight factor of function Count, λ having a greater value has a smaller influence on the function Count, and vice versa.

5) calculating similarities between the sub-sequences in Sub(Lp) and each session browsing page sequence in the reference set one by one. For given sequences l1 and l2, the similarity Sim($l_1,l_2$) between them is calculated using the following formula:

$$Sim(l_1, l_2) = \frac{2 \cdot \sum_i^m \min(w_{1i}, w_{2i})}{\sum_i^m w_{1i} + w_{2i}}$$

wherein $W_{1,i}$ is the $i^{th}$ dimensional weight in sequence $l_1$. Function min returns a smaller one of the two values.

6) for each reference browsing sequence, selecting the largest value of similarity between the reference sequence and the sub-sequence of Sub(Lp) as the weight w_1 of this reference sequence, according to a result of similarity between the sub-sequence of Sub(Lp) and each browsing sequence in the reference set; and picking the first n reference sequences which has the largest weights so as to generate a reference sequence set SeC=$\{l_1,l_2 \ldots l_n\}$.

7) for each candidate reference browsing page sequence in the set SeC, finding out a purchased merchandise set relevant to the sequence as candidate recommendation merchandise; and for each candidate recommendation merchandise, accumulating the weights w_1 of the candidate reference sequences corresponding to the merchandise as the weight w_p of the candidate recommendation merchandise.

8) picking the first m candidate recommendation merchandise having the largest weights w_p as the final recommendation merchandise, and sending them to the user by the recommendation control server.

To sum up, the technical solution of the application has the following advantages: firstly, the technical solution finds relevant purchase merchandise by comparing session page browsing records. The workflow is straightforward, and avoids the problem of incomplete or inaccurate analysis of contents. Secondly, as compared to other recommendation methods by way of data analysis such as merchandise purchase, merchandise scoring or the like, the data source analyzed in this technical solution is the page browsing record of user in the current session. The data has a low dependency and is convenient to collect, and the service object has a low threshold. Finally, the session page browsing records imply user's potential interest tendency and purchasing habits, which is advantageous for improving the accuracy and individualization of recommendation service.

The specific embodiments of the invention have been described above with reference to the accompanying drawings. However, those skilled in the art will understand that various variations and substitutes can be also made to the specific embodiments of the invention without departing from the spirit and scope of the invention, which will all fall within the scope defined by the claims of the invention.

The invention claimed is:

1. A method of analyzing and collecting user interest data, implemented by a computing device comprising a processor, characterized in that the method comprises:
    step A: extracting log data and a merchandise purchase history record corresponding to the log data from a Web server, and processing the log data, thereby generating a page browsing sequence reference set;
    step B: collecting user's log data in real time;
    step C: pre-processing the user's log data when predetermined condition are satisfied; and
    step D: matching the pre-processed log data with the generated page browsing sequence reference set, and determining a set of merchandise that the user is potentially interested in, according to the matching result;
    wherein step A further comprises:
    eliminating log entries whose requested resource is non-page, by checking the suffix of the requested resource URI;
    eliminating log entries whose state response code is error;
    gathering all the log records of the same session identifier so as to form a session log record set belonging to this session identifier; and
    determining whether the session contains a purchase page and a payment page so as to screen sessions for which purchases are finally completed.

2. The method according to claim 1, further comprising:
    step E: sequencing the merchandise in the merchandise set according to a preset recommendation rule.

3. The method according to claim 2, further comprising:
    step F: selecting a final recommendation merchandise according to the result of sequencing and sending it to the user.

4. The method according to claim 1, wherein step C further comprises:

extracting all the log entry sequences in the current session of the user from the log of the Web server so as to initiate recommendation, when the number of pages accessed by this user exceeds a preset number N.

5. The method according to claim 4, wherein step C further comprises:
    eliminating non-page log entries and log entries whose response code is error from the log entry sequence so as to form a refined log entry sequence Lp;
    generating a plurality of continuous log entry sub-sequences having a predetermined length, according to the refined log entry sequence Lp; and
    transforming each sub-sequence in the continuous log entry sub-sequences into a m-dimensional weight vector using the following formula:

$$w_{l,i} = f(l,i) \cdot \left(\frac{1}{\text{Count}(i)} + 1\right)^{1/\lambda} \cdot t(l,i)$$

wherein $W_{1,i}$ represents the $i^{th}$ dimensional weight of a certain sub-sequence, $f(l,i)$ represents the number of times that the URL of the $i^{th}$ dimensional log entry appears in sub-sequence 1, Count(i) represents the number of times that the $i^{th}$ dimensional URL appears in the page browsing sequence reference set, $t(l,i)$ represents the length of time that the client spends in browsing this page for this time, and $\lambda$, is the weight factor of Count function.

6. The method according to claim 1 or 5, wherein step D calculates a matching degree using the following formula:

$$\text{Sim}(l_1, l_2) = \frac{2 \cdot \sum_{i}^{m} \min(w_{1i}, w_{2i})}{\sum_{i}^{m} w_{1i} + w_{2i}}$$

wherein $l_1$ and $l_2$ represent two given sequences, $W_{1i}$ is the $i^{th}$-dimensional weight in sequence $l_1$, $W_{2i}$, is the i-dimensional weight in sequence $l_2$, and function min returns a smaller one of the two values.

7. The method according to claim 1, wherein step D further comprises:
    for each reference browsing sequence in the page browsing sequence reference set, selecting a largest value of matching degree between it and each sub-sequence in the pre-processed log data as the weight of this reference browsing sequence, according to a matching result between the pre-processed log data and the generated page browsing sequence reference set;
    picking the first n reference browsing sequences which has the largest weights so as to generate a reference sequence set SeC; and
    for each candidate reference browsing sequence in the reference sequence set SeC, finding out a purchased merchandise set relevant to the sequence as a set of merchandise that the user is potentially interested in.

8. The method according to claim 1, wherein step E further comprises:
    accumulating the weights of the candidate reference sequences corresponding to each merchandise in the merchandise set as the weight of this merchandise, according to the merchandise set determined by the match analysis module;

sequencing the merchandise in the merchandise set according to the weights of the merchandise; and taking a certain number of merchandise having larger weights as final recommendation merchandise and informing the recommendation service controller.

\* \* \* \* \*